United States Patent
Thomas et al.

[11] Patent Number: 5,146,787
[45] Date of Patent: Sep. 15, 1992

[54] PRESSURE MICROSENSOR

[75] Inventors: Isabelle Thomas; Pierre O. Lefort, both of Valence, France

[73] Assignee: Sextant Avionique, Meudon-la-Foret, France

[21] Appl. No.: 732,193

[22] Filed: Jul. 19, 1991

[30] Foreign Application Priority Data

Jul. 20, 1990 [FR] France .................. 90 09468

[51] Int. Cl.⁵ ............................................ G01L 11/00
[52] U.S. Cl. .................................. 73/704; 73/862.41
[58] Field of Search ................ 73/704, 702, 862.41

[56] References Cited

U.S. PATENT DOCUMENTS

| | | | |
|---|---|---|---|
| 4,229,979 | 10/1980 | Greenwood | 73/704 |
| 4,614,119 | 9/1986 | Zavracky et al. | 73/704 |
| 4,790,192 | 12/1988 | Knecht et al. | 73/721 |
| 4,813,271 | 3/1989 | Greenwood | 73/702 |
| 4,841,775 | 6/1989 | Ikeda et al. | 73/704 |
| 4,881,056 | 11/1989 | Mizukoshi et al. | 338/4 |
| 5,060,526 | 10/1991 | Barth et al. | 73/702 |

*Primary Examiner*—Donald O. Woodiel
*Attorney, Agent, or Firm*—Lowe, Price, LeBlanc & Becker

[57] ABSTRACT

A pressure microsensor comprises, between two plates in an insulating material: a bottom silicon plate (3) forming a base; a middle silicon plate (2) constituting a diaphragm (11) surrounded by a frame (12), a first part (15) of a stud being formed at a decentred location of the diaphragm; and a top silicon plate (1) comprising a frame (17) corresponding to that of the middle plate, a second parts (16) of said stud and a silicon blade (18) constituting a resonator connecting the top of the stud to a high area of the frame. A measuring interval (13) is provided between the diaphragm and the bottom plate, this interval comprising an access (14, 28), and the two insulating plates (4, 5) cooperate with the border of the three assembled silicon plates to form a closed cavity.

6 Claims, 4 Drawing Sheets

PRESSURE MICROSENSOR

BACKGROUND OF THE INVENTION

The present invention relates to a diaphragm and vibrating beam pressure microsensor and more particularly to such a microsensor in which the sensitive elements are essentially obtained by using the silicon etching techniques developed during these last years for manufacturing semiconductor components.

Sensors of this type are known in the art but have generally various drawbacks. Especially, they are often difficult to manufacture and to connect.

Thus, it is an object of the present invention to provide a new pressure microsensor structure with active silicon elements.

Another object of the present invention is to provide such a structure which is simple to manufacture.

Another object of the present invention is to provide such a structure in which bringing the connections between the active parts and the exterior is particularly simple.

SUMMARY OF THE INVENTION

To achieve these objects, the present invention provides a pressure microsensor comprising between two plates of insulating material: a bottom silicon plate forming a base, a middle silicon plate constituting a diaphragm surrounded by a frame, a first part of a stud being formed at a decentred location of the diaphragm; and a top silicon plate comprising a frame corresponding to that of the middle plate, a second part of said stud and a silicon blade constituting a resonator connecting the top of the stud to a high area of the frame. A measuring interval is provided between the diaphragm and the bottom plate, this interval comprising an access, and the two insulating plates cooperate with the border of the three assembled silicon plates to form a closed cavity.

According to an embodiment of the present invention, the silicon plates each comprise an external frame fixed to their central part by an extension, said insulating plates enclosing the silicon plates about said external frame leaving between these insulating plates and the group of silicon plates a free space.

According to an embodiment of the present invention, two blades forming resonators between the stud and distinct parts of the frame to enable the achievement of a differential assembly are provided.

According to an embodiment of the present invention, the stud is disposed in the central part of the diaphragm according to a first direction and at a third of the length of the diaphragm according to a second direction orthogonal to the first.

According to an embodiment of the present invention, the stud is fixed to the frame of the middle silicon plate, by a rib of the diaphragm forming a hinge.

According to an embodiment of the present invention, the excitation and detection electrodes are formed on the bottom face of the top insulating plate, facing said silicon blade forming a resonator and are shaped such as to excite this blade in the transversal direction.

A first advantage of the present invention resides in the manufacturing simplicity which results from the fact that the silicon structure is constituted by three plates which can be manufactured and cut separately. Once assembled by silicon to silicon welding methods, the assembly of the three plates acts as a monolithic structure.

Another advantage of the present invention, resulting from the manufacturing from three silicon plates, resides in the fact that it is not necessary to provide overdoped silicon zones to define etch stop instants. It results from this that the final structure, comprising no doped silicon region, is mechanically stabler.

BRIEF DESCRIPTION OF THE DRAWINGS

The foregoing and other objects, features and advantages of the present invention will be described in more detail in the following description of particular embodiments by referring to the attached drawings in which.

It will be noted that these figures are schematic and are not drawn in scale, only having the role to help in understanding the present invention.

DESCRIPTION OF THE PREFERRED EMBODIMENTS

Figure 1:
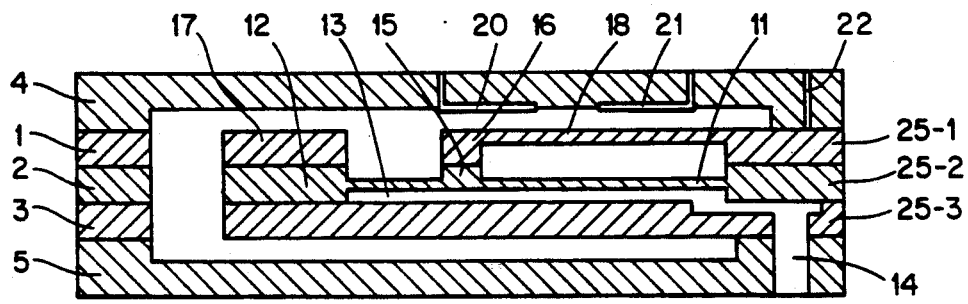
FIG. 1 represents a schematic cross sectional view of an embodiment of a pressure microsensor according to the present invention.

As it is represented in the cross sectional view of FIG. 1, the microsensor according to the present invention comprises three silicon plates 1, 2 and 3 assembled between two plates in an insulating material, classically glass 4 and 5. These plates are assembled by conventional techniques of silicon/silicon and glass/silicon welding, for example by anodic welding.

Figure 2:
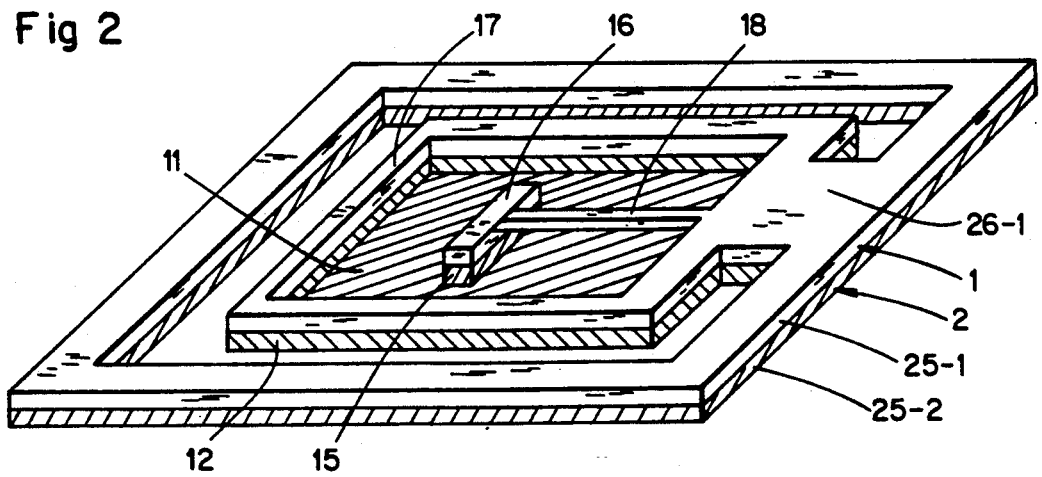
FIG. 2 represents a perspective view of the assembly of two plates of the sensor of FIG. 1.

FIG. 2 represents a perspective view of the assembled plates 1 and 2.

Plate 2 comprises a thin diaphragm 11 surrounded by a frame 12. The second and third silicon plates forme a first cavity 13 therebetween liable to communicate with the pressure to be measured through an opening 14 of the third silicon plate and of the second glass plate. Thus, as a function of the pressure applied to the cavity 13, the diaphragm 11 warps. This diaphragm 11 carries a first decentred part 15 of a stud. The first plate 1 carries a second complementary part 16 of the stud and comprises a frame 17 complementary to frame 12. The detecting element of this pressure sensor is a silicon blade 18 formed in the first plate and extending from the stud to the frame as represented.

Thus, when the diaphragm 11 warps under the applied pressure, the stud tilts and the tension of blade 18 varies. This blade 18 constitutes a vibrating beam or resonator which can be excited into vibration by an alternating field applied to a first electrode 20 formed on the top glass plate 4 and of which the resonating frequency can be detected by a second electrode 21 formed on plate 4. This resonance frequency constitutes an image of the stress applied to the beam and hence of the pressure to be measured. A third electrode 22 establishes the voltage of the vibrating beam 18.

According to an aspect of the present invention, and as it is shown in FIGS. 2 and 3, each of the plates 1, 2 and 3 comprises an external frame 25-1, 25-2, 25-3, attached to the central part of the plate by an extension 26-1, 26-2, 26-63. The glass plates 4 and 5 are supported by the external frame. As a result, the central part of the three plates 1, 2 and 3, corresponding to the active part of the sensor has no direct mechanical connexion with the glass plates, which confers to the sensor an immunity to external vibrations and to differential expansion phenomenae between the silicon and the glass caused by thermal variations.

The glass plates 4 and 5 and the external frames 25 of the silicon plates 1, 2 and 3 form a cavity filled with a controlled atmosphere.

Figure 3A:
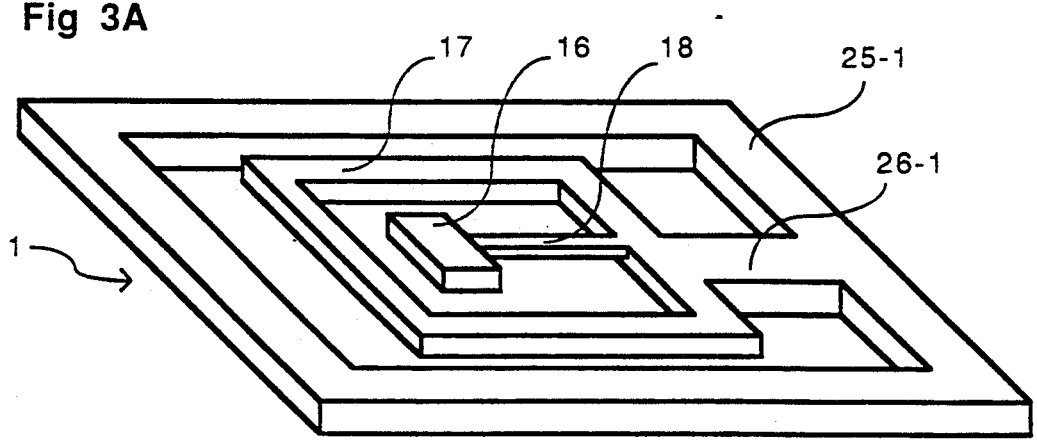
FIGS. 3A, 3B, 3C represent, in perspective, each of the three silicon plates.
Figure 3B:
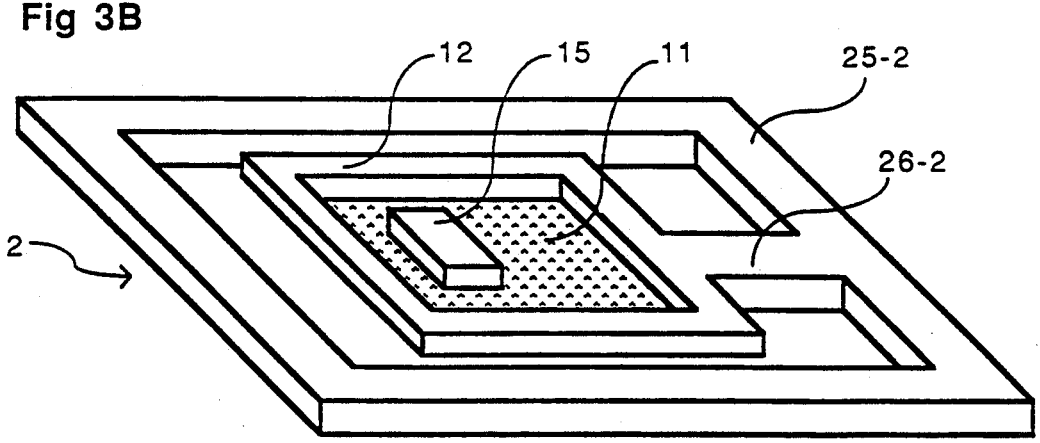
Figure 3C:
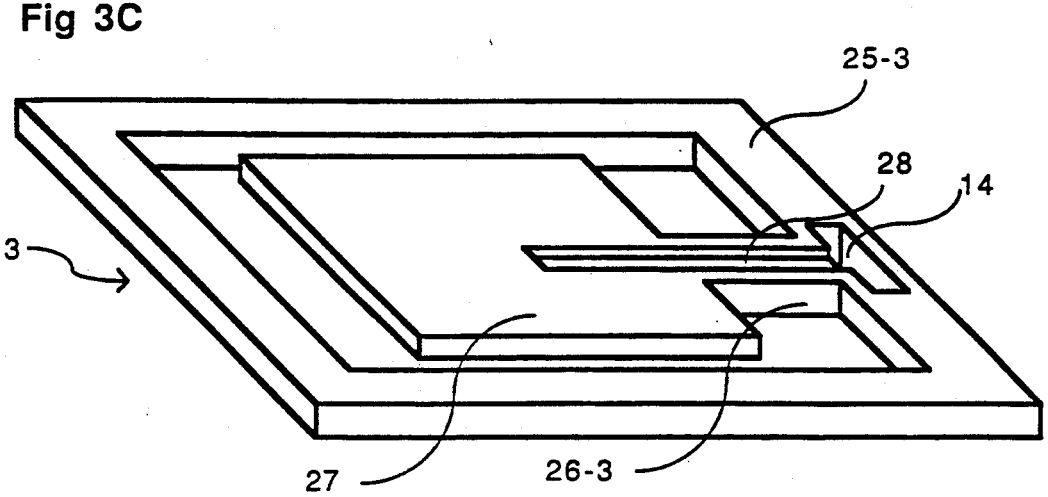

FIGS. 3A, 3B and 3C represent an exploded view of the three silicon plates 1, 2 and 3.

Plates 1 and 2 of FIGS. 3A and 3B have been previously described in detail. Plate 3, shown in FIG. 3C, comprises a central region 27 of which the borders correspond to those of the frames 12 and 17 of FIGS. 3A and 3B. In the embodiment of FIG. 3C, the upper surface of this central region 27 is planar. This implies that the diaphragm 11 of FIG. 3B is slightly retracted with respect to the bottom surface of frame 12 to leave the place for the cavity 13 indicated in FIG. 1. As an alternative, one could provide a central part of the region 27 partially cut away. Furthermore, FIG. 3C represents a channel 28 obtained through anisotropic etching of the silicon, which enables communication between the access hole 14 and the cavity 13.

As a non limiting example, one could provide a sensor having the following dimensions:

Height of plates 1, 2, 3: 0.3 mm
Height of plates 4 and 5: 0.5 mm
Height of blade 18: 0.02-0.04 mm
Height of diaphragm 11: 0.03-0.06 mm
Length of blade 18: 0.8-2 mm
Dimensions of the diaphragm: $2 \times 2$ mm$^2$
Vibration frequency: 30 to 200 KHz.

Figure 4:
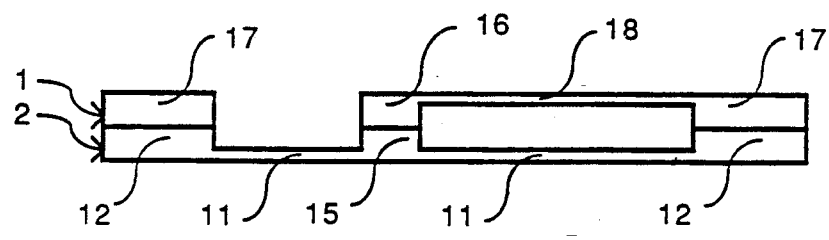
FIG. 4 represents a simplified cross sectional view of two of the plates corresponding to the embodiment of FIG. 2.

FIG. 4 represents a very schematic magnified cross sectional view of plates 1 and 2, without the extension 26 and the external frame 25. It will be noted that stud 15 is approximately located at one third of the length of the diaphragm, and approximately at the middle of the width of this diaphragm.

Figure 5:
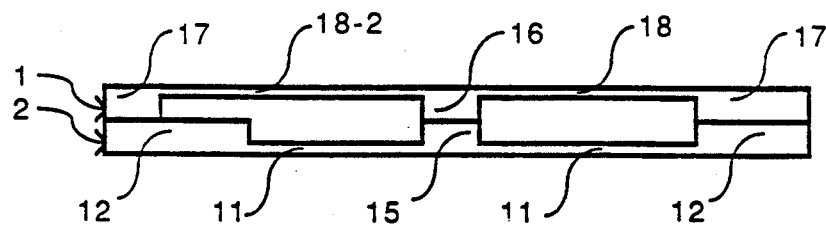
FIG. 5 represents a simplified cross sectional view of an alternative of the structure illustrated in FIG. 4.

FIG. 5 illustrates, according to the same representation as that of FIG. 4, a realization alternative of the present invention enabling the obtention of a differential sensor. The part of FIG. 5 located on the right of stud 15-16 is identical to that of FIG. 4. On the left, frame 12 of plate 2 is widened towards the exterior and receives on its external part the frame 17 which is also connected to the stud 16 by a second silicon blade forming a resonator 18-2. The blades 18 and 18-2 will be, for example, of the same length. Thus, when the stud tilts, the vibrating beams 18 and 18-2 are subjected to contrary stresses and, by measuring the difference between the two resonance frequencies of the two beams, eventual errors due to frequency drifts at zero pressure of each beam are avoided. These drifts have as an origin all the external influences on the microsensor (temperature, acceleration, etc.). Obviously, the top plate 4 will comprise suitable electrodes to excite and detect the vibrations of beam 18-2 as well as the electrodes associated to the beam 18.

Figure 6:
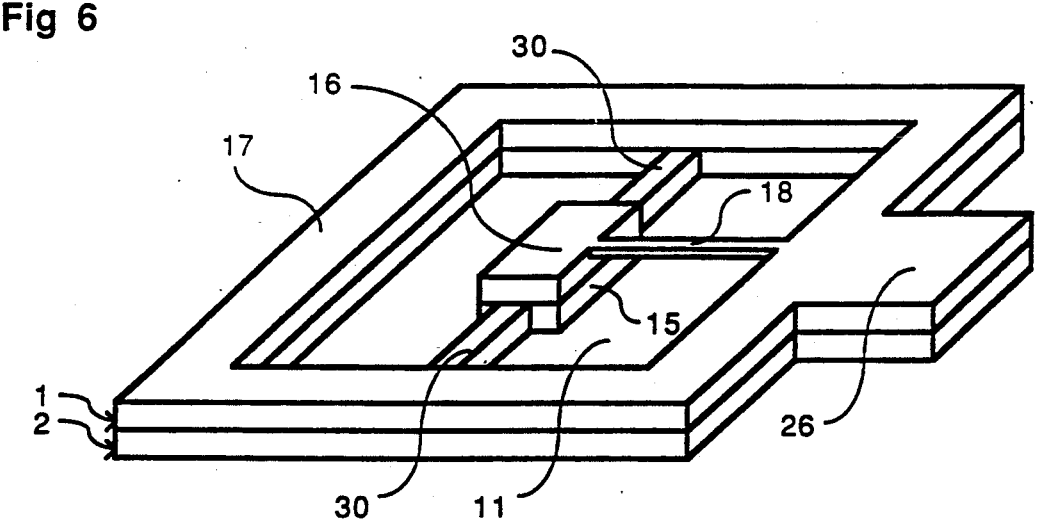
FIG. 6 represents a perspective view of an alternative of the structure represented in FIG. 2.

FIG. 6 illustrates another alternative of the present invention. This figure represents the top plate 1 and the middle plate 2 in a similar representation as that of FIG. 2 except that the external frame 25 has not been represented. The main difference between the embodiment of FIG. 6 and that of FIG. 2 is the fact that the lower part of stud 15 forming part of the plate 2 is attached, perpendicularly to the direction of the vibrating beam 18, to the frame 12 by hinges 30. Thus, when the diaphragm 11 is warped by a pressure, stud 15-16 only rotates with respect to the hinges 30 and does not move orthogonally to the diaphragm.

Experience shows that the presence of the hinges causes less dependency between the sensitivity of the sensor and thickness of the diaphragm. Thus, the sensitivity of the sensor in the alternative embodiment of FIG. 6 overcomes the dependency on certain manufacturing parameters.

Figure 7:
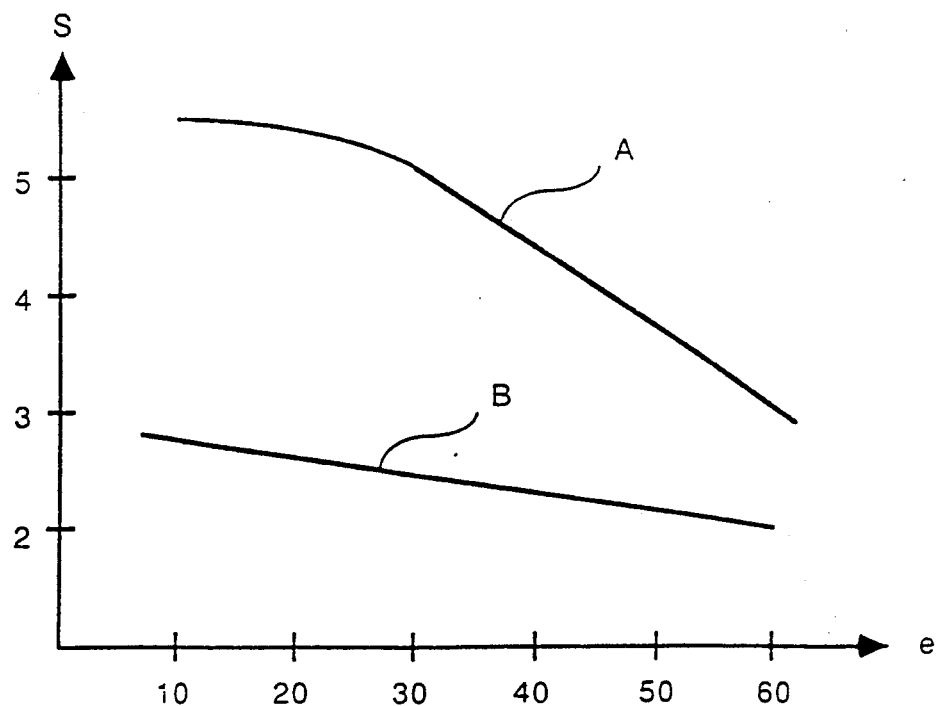
FIG. 7 is a graph illustrating the sensitivity difference between the embodiments of FIGS. 2 and 6.

FIG. 7 shows this characteristic. In this figure, the values on the horizontal axis represent the diaphragm thicknesses (e) in micrometers and the values on the vertical axis represent the sensitivity (S) in an arbitrary scale. It can be seen that, in the diaphragm thickness range of 10 to 60 micrometers, the sensitivity varies of an important factor in the case where there is no hinge (graph A) and of a much smaller factor in the case of FIG. 6 where there are hinges (graph B).

Figure 8A:
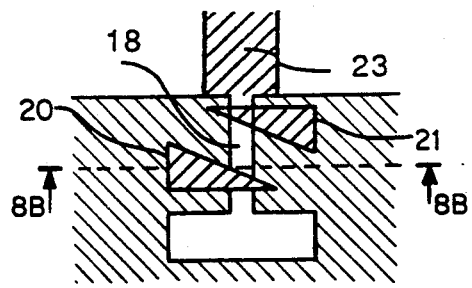
FIGS. 8A and 8B are a bottom view and a partial cross sectional view illustrating an embodiment of an electrode structure.
Figure 8B:
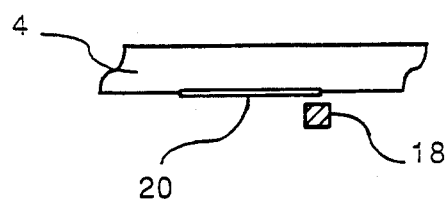

FIGS. 8A and 8B are meant to show an embodiment of the present invention related to the excitation of the vibrating beam 18. Indeed, it is noted that the sensitivity of the device and, especially, the obtention of a good decoupling between the resonator and the other elements of the sensor is better if the beam 18, instead of vibrating in an orthogonal plane to the diaphragm, vibrates in a transversal plane, parallel to the diaphragm. In order to achieve this, the electrodes 20 and 21 formed on the top glass plate 4 can be given the shape shown in FIG. 8A which causes a transversal vibration.

FIG. 8B is a cross sectional view according to the line B—B of FIG. 8A. In FIG. 8A, the reference 23 designates a metallization formed on the frame 17, the extension 26-1 and the frame 25-1, which is meant to establish a better contact to the connexion 22 shown in FIG. 1. In the beam, the conduction is ensured by the conductivity of the silicon itself. However, an additional metallization can be provided although this is liable to affect the operation of the device. It will be noted that the fact that blade 18 terminates on the frame (and not on a second stud) facilitates its connexion.

The manufacturing of a structure such as previously described, and especially the etching of plates 1, 2 and 3, is achieved by conventional manufacturing methods of semiconductor components. The etchings will be conventionally realized by photolithographic and chemical etching methods. The relatively simple shapes of the sensor of the invention do not cause particular difficulties.

Those skilled in the art will note that the present invention can take advantage of the collective manufacturing methods, each of the plates 1, 2 and 3 being part of a silicon wafer comprising a great number of identical plates.

Those skilled in the art will note that various modifications of manufacturing and in structures of the present invention are possible. Namely, the shape of the resonator can be more complex than a simple blade. For example, this resonator can be provided with orthogonal extensions and vibrate in torsion, adapted electrodes being provided. It can also be of a greater length than the diaphragm by shifting the attachment point on the frame. The shape of the device can also be optimized for different pressure ranges.

The detection of the vibration of the resonator can be achieved by other means than capacitive ones, for example by placing a stress gauge at proximity to the area where the beam is fixed to the frame.

The excitation of the beam can be achieved by other means such as electromagnetic forces, by depositing a conductor on the beam, piezoelectric forces, by depositing a piezoelectric material on part of the beam, or by thermal excitation methods.

We claim:

1. A pressure microsensor comprising between two plates of insulating material:
   a bottom silicon plate (3) forming a base,
   a middle silicon plate (2) constituting a diaphragm (11) surrounded by a frame (12), a first part (15) of a stud being formed at a decentred location of the diaphragm,
   a top silicon plate (1) comprising a frame (17) corresponding to that of the middle plate, a second part (16) of said stud and a silicon blade (18) constituting a resonator connecting the top of the stud to a high area of the frame, a measuring interval (13) being provided between the diaphragm and the bottom plate, this interval comprising an access (14, 28), and the two insulating plates (4, 5) cooperating with the border of the three assembled silicon plates to form a closed cavity.

2. A microsensor as claimed in claim 1, wherein the silicon plates each comprise an external frame (25) fixed to their central part by an extension (26), said insulating plates enclosing the silicon plates about said external frame leaving between these insulating plates and the group of silicon plates a free space.

3. A microsensor as claimed in claim 1, comprising two blades (18, 18-2) forming resonators between the stud and distinct parts of the frame to enable the achievement of a differential assembly.

4. A microsensor as claimed in claim 1, wherein the stud is disposed in the central part of the diaphragm according to a first direction and at a third of the lenght of the diaphragm according to a second direction orthogonal to the first.

5. A microsensor as claimed in claim 1, wherein the stud is fixed to the frame, of the middle silicon plate, by a rib of the diaphragm forming a hinge (30).

6. A microsensor as claimed in claim 1, wherein the excitation and detection electrodes are formed on the bottom face of the top insulating plate, facing said silicon blade forming a resonator and are shaped such as to excite this blade in the transversal direction.

* * * * *